(12) United States Patent
He et al.

(10) Patent No.: US 12,380,595 B2
(45) Date of Patent: Aug. 5, 2025

(54) DUAL DISTANCED SENSING METHOD FOR PASSIVE RANGE FINDING

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 401 days.

(21) Appl. No.: 17/511,571

(22) Filed: Oct. 27, 2021

(65) Prior Publication Data

US 2022/0207769 A1    Jun. 30, 2022

Related U.S. Application Data

(60) Provisional application No. 63/131,301, filed on Dec. 28, 2020.

(51) Int. Cl.
| | |
|---|---|
| *G06K 9/00* | (2022.01) |
| *G06T 7/73* | (2017.01) |
| *G06V 10/60* | (2022.01) |

(52) U.S. Cl.
CPC .............. *G06T 7/74* (2017.01); *G06V 10/60* (2022.01); *G06T 2207/30252* (2013.01)

(58) Field of Classification Search
CPC .. G06T 7/50; G06T 7/55; G06T 7/571; G06T 7/579; G06T 7/586; G06T 7/593;
(Continued)

(56) References Cited

U.S. PATENT DOCUMENTS 10,963,734 B1 *   3/2021   Wang .................... G06T 7/74
11,427,193 B2 *   8/2022   Jiang .................... G01S 17/86
(Continued)

FOREIGN PATENT DOCUMENTS

| CN | 104019802 A | 9/2014 |
| CN | 108225278 A | 6/2018 |

(Continued)

OTHER PUBLICATIONS

State Intellectual Property Office of the People's Republic of China, first Office Action issued in Application No. 202111527816.6, Jul. 1, 2023, 9 pages.

*Primary Examiner* — Atiba O Fitzpatrick
(74) *Attorney, Agent, or Firm* — Finnegan, Henderson, Farabow, Garrett & Dunner, LLP

(57) ABSTRACT

In various embodiments, image sensors are configured for detecting object distance based on images captured by the image sensors. In those embodiments, parameters within the images are analyzed to determine a distance of the object relative to the image sensors. In some implementations, techniques for distance detecting object distance in accordance with the present disclosure are deployed within a vehicle. In those implementations, the distance sensing in accordance with the present disclosure can be used to aid various driving scenario, such as different levels of autonomous self-driving by the vehicle. In some implementations, the distance sensing can be employed in robotic equipment such as unmanned underwater devices to aid distance sensing of certain underwater objects of interest. In some implementations, the distance sensing can be employed in monitoring or surveillance for detecting or measuring object distance relative to a reference point.

18 Claims, 9 Drawing Sheets

(58) Field of Classification Search
CPC .. G06T 7/596; G06T 7/70; G06T 7/73; G06T 7/74; G06T 2207/10028; G06T 2207/30244; G06T 2207/30248; G06T 2207/30256; G06T 2207/30252; G06T 7/62; G06T 7/60; G06T 2207/10024; G06T 7/90; B60R 2300/8093; B60R 2300/00; B60R 2300/10; B60R 2300/101; B60R 2300/105; H04N 23/695; B64D 47/08; G06V 20/56; G06V 20/58; G06V 20/582; G06V 20/584; G06V 20/588; G06V 10/25; G06V 10/255; G06V 10/56; B64C 39/024

See application file for complete search history.

(56) References Cited

U.S. PATENT DOCUMENTS

| | | | | |
|---|---|---|---|---|
| 2008/0181488 | A1* | 7/2008 | Ishii | G06V 20/56 382/154 |
| 2017/0341583 | A1* | 11/2017 | Zhang | H04N 7/181 |
| 2020/0192365 | A1* | 6/2020 | Russell | B60W 30/0956 |
| 2020/0262350 | A1* | 8/2020 | Takhirov | H04N 23/959 |
| 2021/0012520 | A1* | 1/2021 | Zhou | B64U 20/87 |
| 2021/0019897 | A1* | 1/2021 | Biswas | G06T 7/11 |
| 2021/0041883 | A1* | 2/2021 | Bansal | G05D 1/0088 |
| 2021/0097707 | A1* | 4/2021 | Oba | G08G 1/167 |
| 2021/0325176 | A1* | 10/2021 | Awai | G06T 7/0002 |
| 2022/0067961 | A1* | 3/2022 | Tazoe | G06T 7/62 |
| 2022/0113419 | A1* | 4/2022 | Sharma | G01S 17/931 |
| 2022/0282990 | A1* | 9/2022 | Reuveni | B60W 30/0953 |
| 2022/0383585 | A1* | 12/2022 | Lee | G06T 15/08 |
| 2023/0076036 | A1* | 3/2023 | Jiang | B60W 30/09 |

FOREIGN PATENT DOCUMENTS

| | | |
|---|---|---|
| CN | 108362266 A | 8/2018 |
| CN | 110536109 A | 12/2019 |
| WO | WO-2014111442 A1 * | 7/2014 ........... G06T 7/0071 |

* cited by examiner

DUAL DISTANCED SENSING METHOD FOR PASSIVE RANGE FINDING

CROSS-REFERENCES

This application claims the benefit of priority from U.S. Provisional Patent Application No. 63/131,301, titled "DUAL DISTANCED SENSING METHOD FOR PASSIVE RANGE FINDING", filed Dec. 28, 2020, which is hereby incorporated by reference in its entirety.

TECHNICAL FIELD

This disclosure relates to distance sensing, and, more particularly, to using image sensors, to implement distance sensing for systems such as vehicle, and robotic equipment.

BACKGROUND

Distance sensing is generally known in the art. Distance sensors (or proximity sensors) generally work by outputting a signal of some kind, (e.g., laser, infrared (IR) LED, or ultrasonic waves) and then reading how the signal has changed on its return. That change may be in the intensity of the returned signal, the time it takes the signal to return, etc. Techniques have been developed for sensors such as Ultra Sonic Sensor, IR LED sensor, Laser Distance Sensor (LIDAR), and LED Time-Of-Flight Distance Sensor,

SUMMARY

Embodiments provide novel types approaches to implementing distance sensing and measuring using image sensors. In various embodiments, image sensors are configured for detecting object distance based on images captured by the image sensors. In those embodiments, parameters within the images are analyzed to determine a distance of the object relative to the image sensors. In some implementations, techniques for distance detecting object distance in accordance with the present disclosure are deployed within a vehicle. In those implementations, the distance sensing in accordance with the present disclosure can be used to aid various driving scenario, such as different levels of autonomous self-driving by the vehicle. In some implementations, the distance sensing in accordance with the present disclosure can be employed in robotic equipment such as unmanned underwater devices to aid distance sensing of certain underwater objects of interest. In some implementations, the distance sensing in accordance with the present disclosure can be employed in monitoring or surveillance for detecting or measuring object distance relative to a reference point. Other implementations of the distance sensing in accordance with the present disclosure are contemplated.

BRIEF DESCRIPTION OF THE DRAWINGS

The accompanying drawings, referred to herein and constituting a part hereof, illustrate embodiments of the disclosure. The drawings together with the description serve to explain the principles of the invention.

Figure 1:
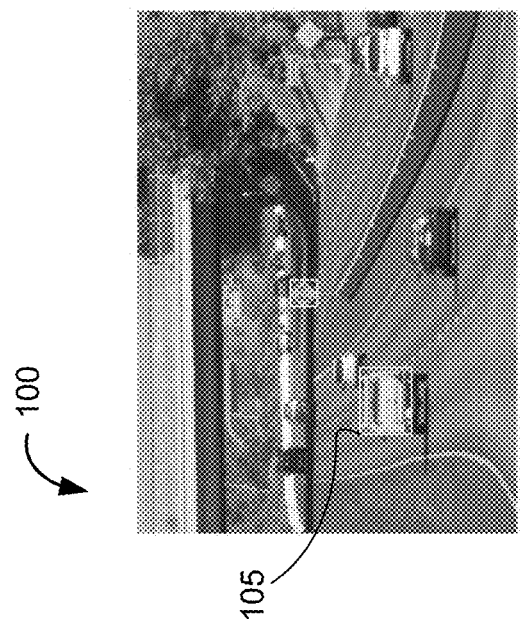
FIG. 1 shows one embodiment of distance sensing in accordance with the present disclosure, where an image area of an object captured by image sensors can be measured for determining a distance of the object relative to the image sensors.
Figure 1:
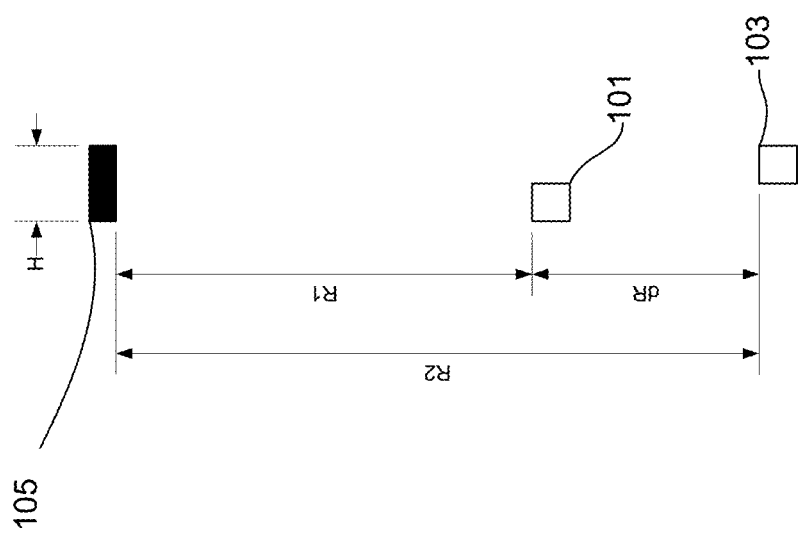

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Conventional distance sensing typically involves generating a signal, transmitting a signal towards an object, receiving a returned signal and comparing certain aspects of returned signal with those of the original signal to determine a distance of the object. For example, a typical LIDAR sensor emits pulsed light waves into the surrounding environment. These pulses bounce off surrounding objects and return to the LIDAR sensor. The LIDAR sensor uses the time it took for each pulse to return to the sensor to calculate the distance it traveled.

However, one problem for this conventional approach is that it does not scale well to be used in various scenarios such as autonomous driving. Take LIDAR sensor as an example, while it may work well in a situation where limited amount of LIDAR sensors are in its surrounding environment, it may not work as well when a large number of LIDAR sensors are sending signals to more or less the same object(s) in the environment. This can typically happen on a road, where LIDAR sensors of multiple vehicles are transmitting signals towards same object(s) in the environment at more or less the same time. This can result in signal interference and wrong signal is intercepted by a LIDAR that did not transmit that signal. In short, for achieving distance sensing in a complex environment such as a busy highway, conventional distance sensing techniques do not work all that well.

Image sensors, such as cameras, are generally considered in the art less suitable for distance sensing as compared to other conventional sensors mentioned above like LIDAR sensor. This is mainly due to analyzing an image is much more complicated and time consuming than analyzing a received signal. This is more acute in a real-time situation such as autonomous driving, where processing and measuring is required to be almost instant. For example, if there is a truck ahead on the road, the vehicle should know that information well before the vehicle is coming close to the truck. It is difficult to analyze an image captured by the camera onboard the vehicle and determine there is a truck ahead in very small amount of time (no more than a few seconds) using image analysis techniques without large processing power.

However, unlike the conventional distance sensing techniques, distance sensing using image sensors are much less prone to signal interferences. Images of objects can be captured just like how human eyes may perceive the objects. An insight provided by the inventors of the present disclosure is that image sensor may be used for distance sensing if the processing of captured images of objects in a scene can be somehow reduced to a manageable degree such that the image based object distance measuring can be completed in less than a few seconds.

FIG. 1 illustrates one embodiment of distance sensing using image sensors in accordance with the present disclosure. As shown in FIG. 1, image sensor 101 and 103 are placed at different distances relative to an object 105 in field of view (FOV) of both image sensors 101 and 103. In the configuration shown in FIG. 1, image sensor 101 is placed at a distance R2 relative to object 105, and image sensor 103 is placed at a distance R1 relative to the object 105. As also shown in FIG. 1, an image 100 of the object 105 can be captured by image sensors 101 and 103 simultaneously or almost simultaneously.

Conventionally, after the image 100 is taken by an image sensor, image analysis is employed to identify object 105 from image 100 and image analysis is performed based on the single image captured, which, as mentioned above, could be time and processing consuming. In this embodiment, since multiple images of the object are captured by image sensors 101 and 103 more or less at the same time, image parameters such as an area or a dimension of object 105 in the multiple images can be measured and compared for determining distance R1. For example, let's assume image sensor 101 has a focal length f1, and image sensor 103 has a focal length f2. Let's also assume object 105 has a width H in the real scene as shown in FIG. 1. The image width h1 of object 105 captured by image sensor 101 is thus: h1~f1*H/R1. The image width h2 of object 105 captured by image sensor 103 is: h2~f2*H/R2. Since the image sensors 101 and 103 are arranged such that distance R2=R1+dR, the following is true $$h1/h2 = f1*(R1+dR)/(f2*R1) \quad \text{(formula 1)}$$

In formula 1 above, dR is a distance between image sensors 101 and 103, which is predetermined and preset. Both f2 and f1 are known. Thus, the object distance R1 can be solved according to formula 1 by measuring the image width h1 and h2 of object 105 in images captured by image sensors 101 and 103.

Measuring a width of object 105 in an image, such as h1 or h2 can be achieved in a timely fashion. One way of measuring such a dimension in an image is by counting pixels that have similar pixel values, such as color. As shown in the image 100, the object 105 is a white truck and the road is black. Thus, the number of white pixels representing object 105 in the image 100 can be counted. Although there are other white objects in image 100, these objects are apart from the white object (truck) 105, thus they would not be counted as part of white object (truck) 105 so long as only adjacent white pixels are counted. Since image sensors 101 and 103 are arranged relatively proximate to each other, the white object (truck) 105 appears more or less the same position in image 100 for both image sensors 101 and 103. Thus, the same or similar white pixels representing object 105 can be counted in the image 100 captured by image sensors 101 and 103 for determining h1 and h2.

In one implementation, the image dimensions of object 105 may be measured with the help of an image outline frame. For example, assuming object 105 area in the real scene is A. The image area a1 captured by sensor 101 is thus: a1~f1^2*A/R1^2, and the image area a2 captured by sensor 103 is: a2~f2^2*A/R2^2. According these relationships, the following is true:

$$a1/a2 = f1^2*(R1+dR)^2/(f2*R1)^2 \quad \text{(formula 2)}$$

In formula 2, dR, f1 and f2 are known as explained above. Thus, the object distance R1 can be solved according to formula 2 by measuring the image areas a1 and a2 of object 105 in images captured by image sensors 101 and 103.

Figure 2:
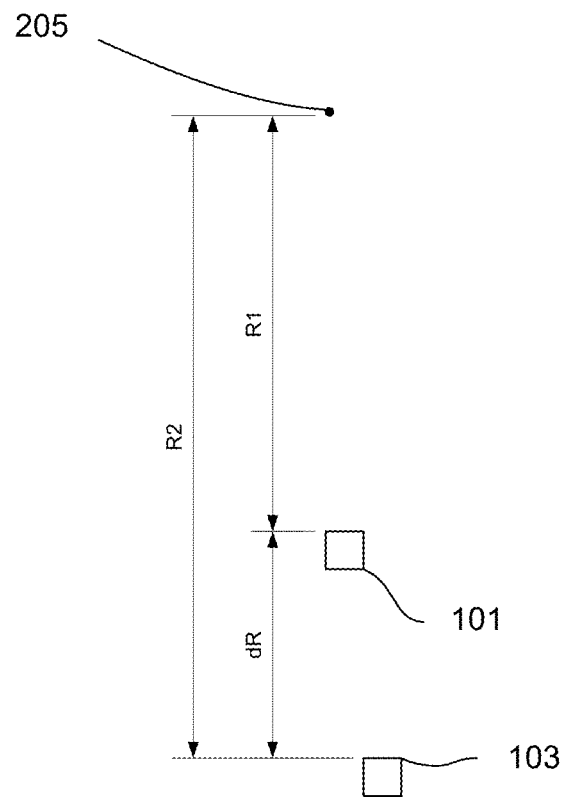
FIG. 2 shows one embodiment of distance sensing in accordance with the present disclosure, where irradiance of an object in images captured by image sensors can be measured for determining a distance of the object relative to the image sensors.

FIG. 2 illustrates another example of distance sensing in accordance with the present disclosure. In this example, the image sensors 101 and 103 are set up similarly to FIG. 1 to capture images. In this example, the image analysis focuses on irradiance of an object capture in the images by image sensors 101 and 103. As shown in FIG. 2, a point target 205 can be captured by image sensor 101 or 103. In some examples, a point target may mean that an image size of a target of interest is smaller than a detector pixel. Let's assume image sensor 101 aperture is $\Phi 1$, image sensor 103 aperture is $\Phi 2$ and point target 205 irradiance is IRRA in the real scene. The image brightness of target 205 b1 in the image captured by sensor 101 is thus: b1~IRRA*$\Phi 1$/R1^2. The image brightness in the image captured by the sensor 103 is b2~IRRA*$\Phi 2$/R2^2. Since R2=R1+dR, the following is true:

$$b1/b2 = \Phi 1*(R1+dR)^2/(\Phi 2*R1^2) \quad \text{(formula 3)}$$

Thus, as explained above, dR, $\Phi 1$, $\Phi 2$ are known, the object distance R1 can be solved according to formula 3 by measuring brightness b1 and b2 of point target 205 in the images captured by image sensors 101 and 103.

Figure 3:
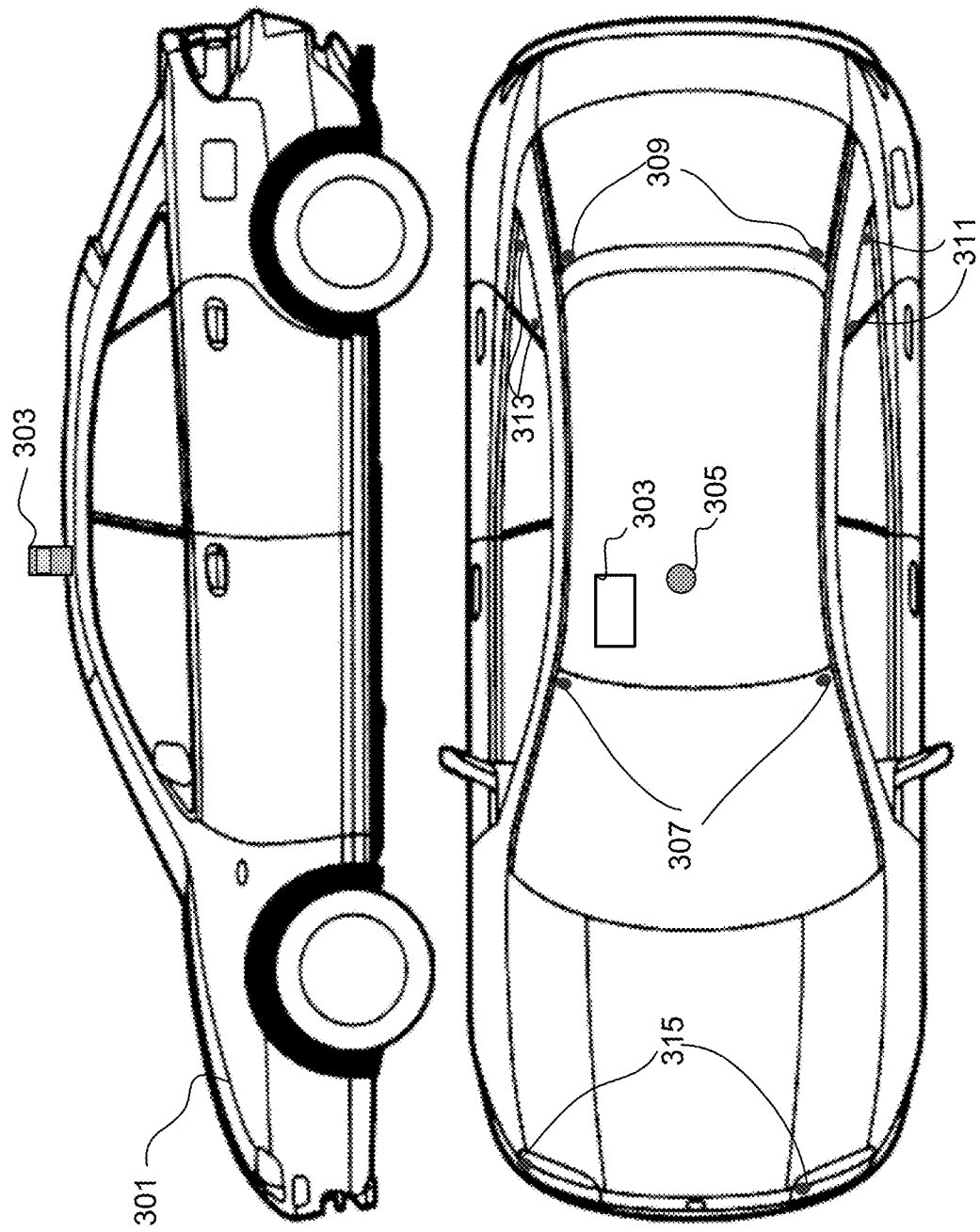
FIG. 3 shows one embodiment of distance sensing in accordance with the present disclosure, where example configurations of image sensors are shown to be arranged on various points of a vehicle.

This method of sensing object distance using image sensors can be useful if the target object is a shining or illuminated object, for example a traffic light. Measuring brightness of a traffic light in an image can be achieved by finding the pixels that have high illuminance values compared to surrounding pixels. The illuminance values of these pixels across images captured by image sensors 101 and 103 can be compared as shown in FIG. 3 to solve distance R. As also explained above, since image sensors 101 and 103 are arranged at similar positions except for their distances to the point target 205, the positions of point target 205 in the images captured by image sensors 101 and 103 would appear more or less at the same position. This makes it achievable to compare b1 and b2 quickly without requiring lots of processing.

FIG. 3 shows another embodiment of distance sensing in accordance with the present disclosure. As can be seen, in this embodiment, various image sensors are arranged on various points of a vehicle 301. In this example, sensor 303 is a scanning sensor, which can be designed to scan across a scene continuously. The sensor 303 can be configured to cooperate with other sensors to detect object in different directions, for example sensors 305, 307, 309, 311, 313, and 315 shown in this example. 305 is a sensor for top vision detection, 307 are sensors for front vision detection, 309 are sensors for back vision detection, 311 are sensors for driver side vision detections, 313 are sensors for passenger side vision detection, and 315 are installed at the front side of the vehicle 301. In implementations, the sensors shown in FIG. 3 can be paired or grouped to detect the object distance using the distance sensing methods described and illustrated herein. In some implementations, triangular method can be employed in some of the grouped sensors for distance sensing. Although the sensors are shown to be installed on specific points on vehicle 301 in this example, this is not intend to limit configurations of image sensor arrangement for distance sensing in accordance with the present disclosure. It is understood that the image sensors can be installed anywhere on the vehicle 301 as long as they are reliable and convenient for capturing images of the scene.

Figure 4:
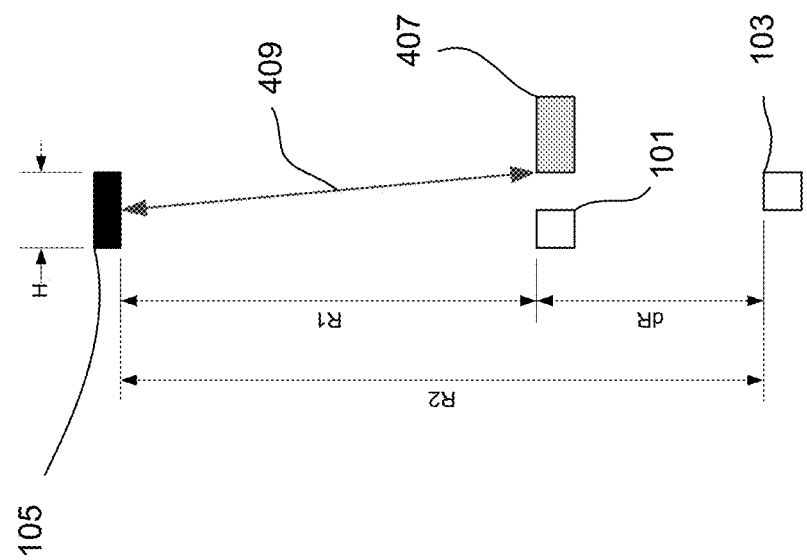
FIG. 4 shows one embodiment of distance sensing in accordance with the present disclosure, where a range finding sensor can be used to aid distance measuring by image sensors in accordance with the present disclosure.

FIG. 4 shows yet another embodiment of distance sensing in accordance with the present disclosure. In this embodiment, a range finder 407 is employed. Examples of the range finder 407 may include a laser, RF, ultrasound, and/or any other type of range finders. As shown in FIG. 4, the range finder 407 may be configured to transmit a probe beam 409 towards the object 105. As mentioned above, the range finder 407 can detect a distance of the object 105 relative to the range finder 407 by receiving the beam 409 after it is bounced back from the object 105. As shown in FIG. 4, the range finder 407 may be arranged at more or less the same position to image sensor 101 such that the range finder 407 has a distance to the object 105 more or less the same as distance R1. Thus, when the distance sensing through image sensors 101 and 103, and the range finder 407 are dealing with same object—for example, object 105, the range finder 407 can be used to calibrate the distance sensing through image sensors 101 and 103. In implementations, the range finder 407 may be used to perform real time distance calibration.

Figure 5:
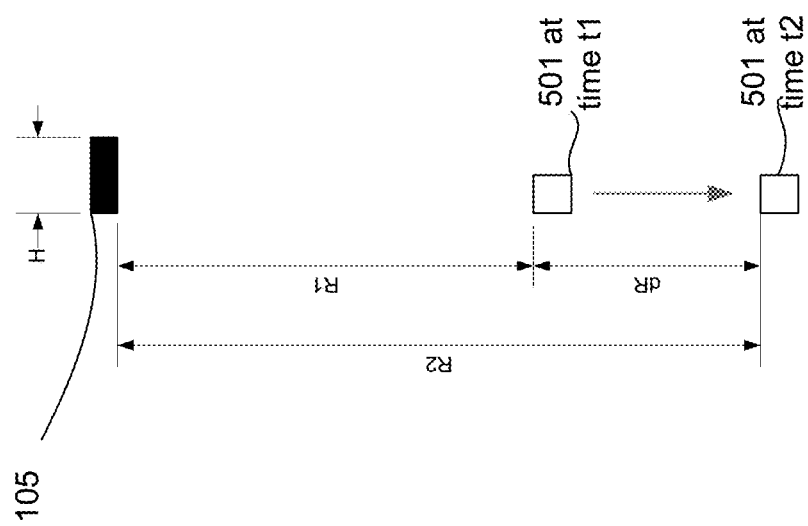
FIG. 5 shows one embodiment of distance sensing in accordance with the present disclosure, where a position sensor can be used to aid distance measuring by image sensors in accordance with the present disclosure.

FIG. 5 shows still another embodiment of distance sensing in accordance with the present disclosure, where a position sensor can be used to aid distance measuring by image sensors in accordance with the present disclosure. In this example, the image sensor 501 is combined with a position sensor, such as a G sensor, a GPS device, and/or any other position sensor. The position sensor can output a position of the image sensor 501 at a given point of time. For example, as shown in FIG. 5, the position sensor may output a first position of image sensor 501 at time t1 and a second portion of image sensor 501 at time t2. The first position and second position of image sensor 501, as shown, satisfy a distance relationship illustrated in FIG. 1. In this way, as the image sensor 501 moves to different positions, images of object 105 are captured for achieving the distance sensing described and illustrated herein. In implementations, the example shown in FIG. 5 may be applied may be applied in the stationary or non-moving scene detection—for example in a surveillance scenario, where the object being monitored is stationary. In another scenario, this embodiment can be applied to detect stationary objects such as road signs and traffic lights in autonomous driving. In some implementations, a speedometer may be used to track the positions of image sensor 501 at different points of time when the image sensor is mounted on a vehicle or any moving device such as an underwater unmanned device.

Figure 6:
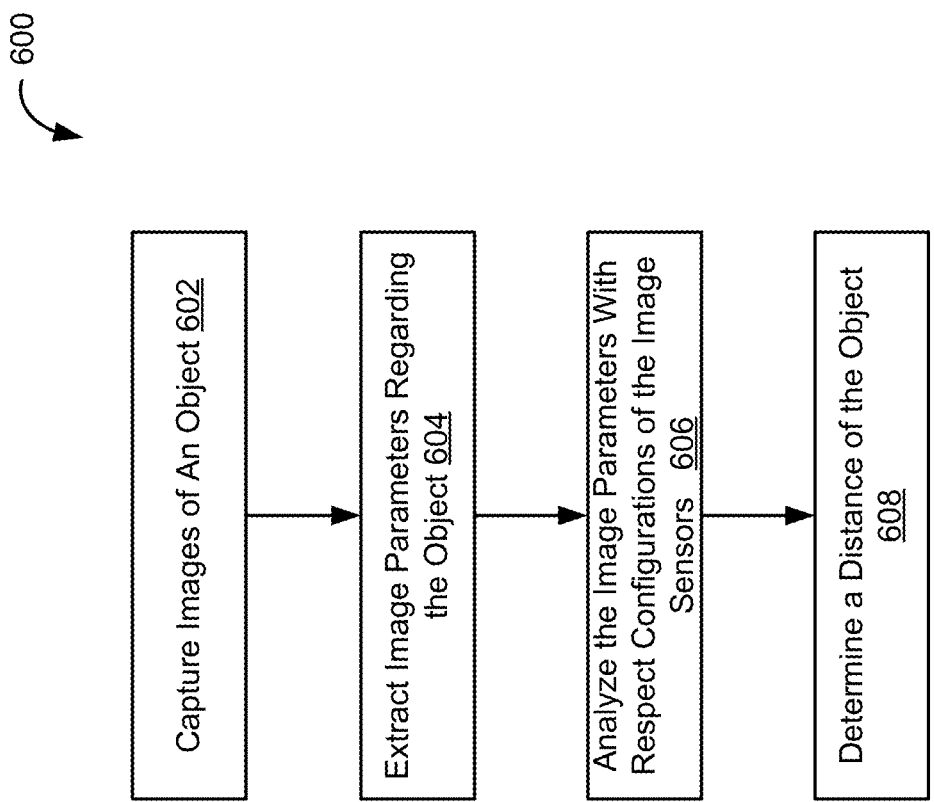
FIG. 6 shows one example method of measuring object distance using image sensors in accordance with the present disclosure.

FIG. 6 shows one example method of measuring object distance using image sensors in accordance with the present disclosure. The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At 602, images of an object can be captured by multiple image sensors simultaneously or near simultaneously. FIGS. 1-5 illustrates some examples of how 602 may be achieved in implementations.

At 604, image parameters regarding the images captured at 602 can be extracted. Example image parameters may include pixel color values, pixel illuminance values and/or any other image parameters.

At 606, the image parameters extracted at 604 can be analyzed for determining a distance of an object in the images relative to the image sensors. For example, pixels having similar color and/or illuminance values can be counted to determine an area in the images representing the object. As explained above, different area values for the object in different images can be compared for determining the distance of the object relative to the image sensors.

At 608, a distance of the object can be determined based on the image parameters analyzed at 606. Example determinations of the object distance can be found at formula 1 through formula 3 described and illustrated herein.

Figure 7:
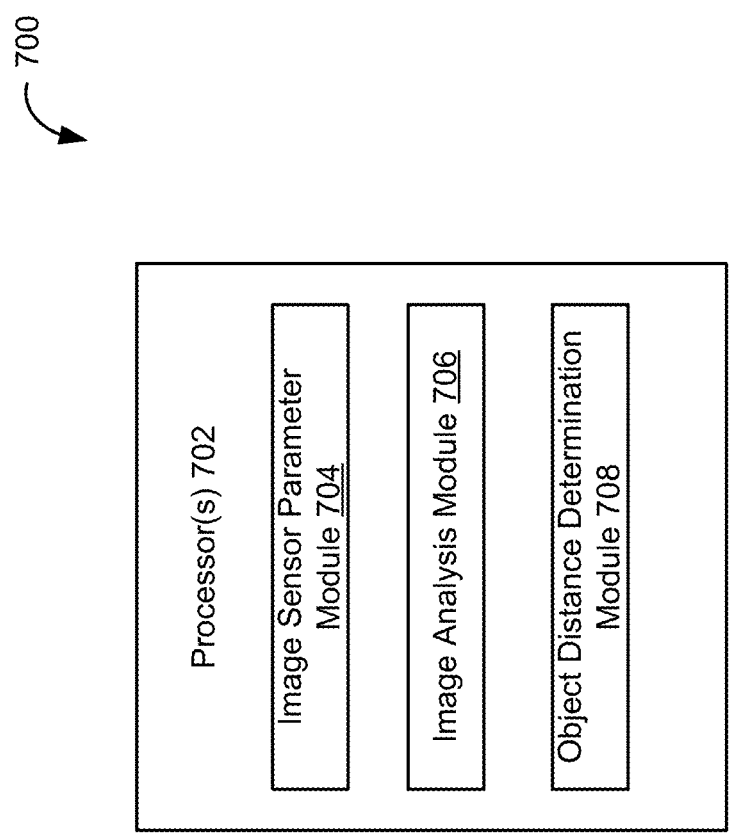
FIG. 7 shows one example implementation of distance sensing using image sensors in accordance with the present disclosure.

FIG. 7 shows an example device 700 that can be used to implement various distance sensing methods for various embodiments described and illustrated herein. As shown, the device 700 may include one or more of a processor 702 configured to execute program code. In one implementation, the device 700 is a vehicle control unit (VCU) installed in a vehicle. As shown, the processor 702 can include an image sensor parameter module 704, an image analysis module 706, an object distance determination module 708, and/or any other modules. The image sensor parameter module 704 can be configured to store various parameters regarding image sensors used to capture images of a scene, for example such as focal lengths and aperture sizes of image sensors 101 and 103 shown in FIG. 1 and FIG. 2. The image analysis module 706 may be configured to receive input images captured by image sensors; and analyze the images. Example of the image analysis operations that can be performed by image analysis module 706 may include detecting and counting pixels having similar color and/or illuminance value, and/or any other operations. The object distance determination module 708 may be configured with various logic such as the ones shown through formula 1 through formula 3 described and illustrated herein. The object distance determination module 708 may be configured to retrieve various relevant image sensor parameters from the image sensor parameter module 704, and object attribute values (such as an area of the object in a particular image) from the image analysis module 706 in accordance with the logic configured in the object distance determination module 708. Based on these inputs, the object distance determination module 708 may be configured to determine and output an object distance in accordance with the logic configured therein.

Figure 8:
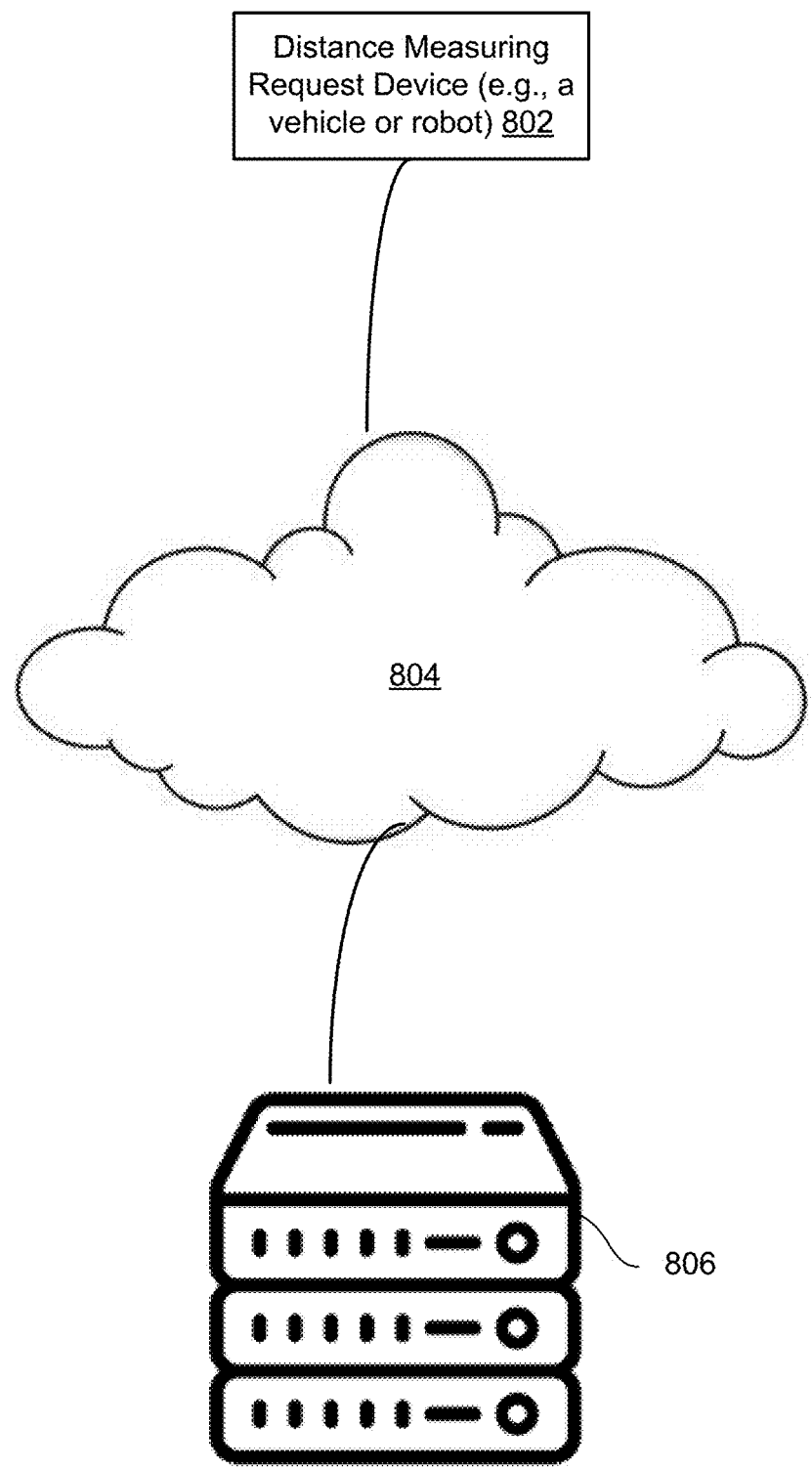
FIG. 8 shows one example scenario where distance sensing in accordance with the present disclosure is applied.

FIG. 8 shows one example scenario where distance sensing in accordance with the present disclosure is applied. As shown in this example, a distance measuring request device 802, such as a vehicle or robot, may be configured to generate a request for measuring object distance. In implementations, the request may include images of a scene captured at various points of time. As shown, the request can be transmitted from the distance measuring request device 802 to a server 806 through a wireless network 804. The server 806 can be configured to determine the object distance in accordance with various methods described and illustrated herein. In one implementation, the server 806 may include the processor 702 shown in FIG. 7.

Figure 9:
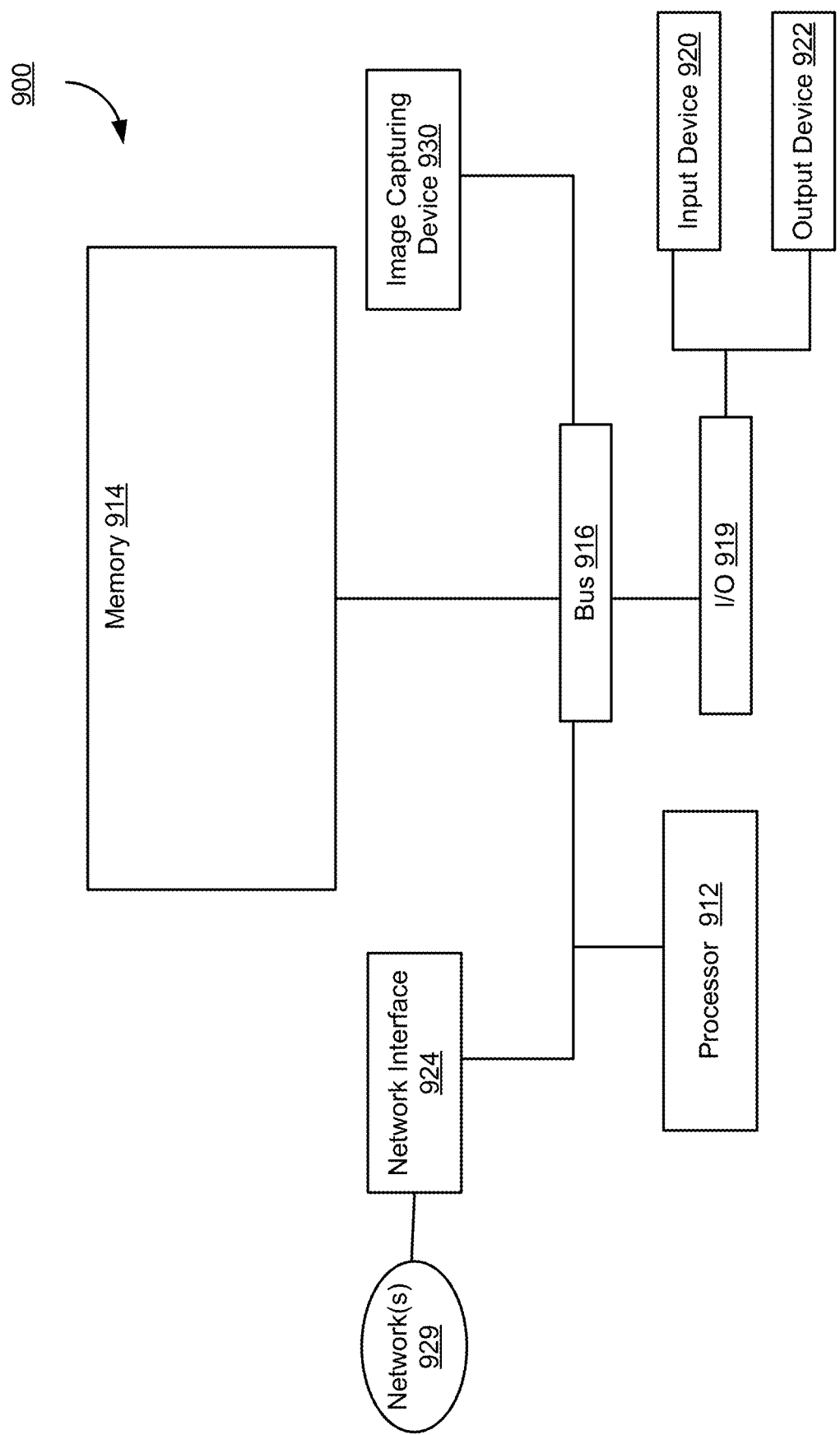
FIG. 9 depicts an example of a system that can implement some embodiments described and illustrated herein.

Computing System Example for Implementing the Conjugate Image Method in Accordance with the Present Disclosure Any suitable computing system can be used for performing the operations described herein. For example, FIG. 9 depicts an example of a system 900 that can implement the method 700 shown in FIG. 7. In some embodiments, the system 900 can include a processor 912 that is communicatively coupled to a memory 914 and that executes computer-executable program code and/or accesses information stored in the memory 914. The processor 912 may comprise a microprocessor, an application-specific integrated circuit ("ASIC"), a state machine, or other processing device. The processor 912 can include any of a number of processing devices, including one. Such a processor can include or may be in communication with a computer-readable medium storing instructions that, when executed by the processor 912, cause the processor to perform the operations described herein.

The memory 914 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The system 900 can also include a bus 916. The bus 916 can communicatively couple one or more components of the system 900. The system 900 can also include a number of external or internal devices such as input or output devices. For example, the system 900 is shown with an input/output ("I/O") interface 919 that can receive input from one or more input devices 920 or provide output to one or more output devices 922. The one or more input devices 920 and one or more output devices 922 can be communicatively coupled to the I/O interface 919. The communicative coupling can be implemented via any suitable manner (e.g., a connection via a printed circuit board, connection via a cable, communication via wireless transmissions, etc.). Non-limiting examples of input devices 920 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 922 include an LCD screen, an external monitor, a speaker, or any other device that can be used to display or otherwise present outputs generated by a computing device.

The system 900 can execute program code that configures the processor 912 to perform one or more of the operations described above with respect to FIGS. 1-5. The program code can include the image processing application 104. The program code may be resident in the memory 914 or any suitable computer-readable medium and may be executed by the processor 912 or any other suitable processor.

The system 900 can also include at least one network interface device 924. The network interface device 924 can include any device or group of devices suitable for establishing a wired or wireless data connection to one or more data networks 929. Non-limiting examples of the network interface device 924 include an Ethernet network adapter, a modem, and/or the like. The system 900 can transmit messages as electronic or optical signals via the network interface device 924.

The system 900 can also include image capturing device (s) 930, such as a camera or other imaging device that is capable of capturing a photographic image. The image capturing device(s) 930 can be configured to capture still images and/or video. The image capturing device(s) 930 may utilize a charge coupled device ("CCD") or a complementary metal oxide semiconductor ("CMOS") image sensor to capture images. Settings for the image capturing device(s) 930 may be implemented as hardware or software buttons. In some examples, the system 900 can include a regular color camera configured for capturing RGB color images and an MR camera configured for capturing NIR images. The regular color camera and the NIR camera can be configured so that the fields of the view of the two cameras are substantially the same. In addition, the two cameras may have a matching resolution and have a synchronous image capturing from both sensors.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A distance measuring method, the method being implemented electronically by a processor, and the method comprising:
    storing parameters regarding image sensors;
    receiving images captured by the image sensors, the images capturing a same scene, wherein the image sensors include a first image sensor located on a first location of a vehicle, and a second image sensor located on a second location of the vehicle, and wherein the first image sensor is configured to capture a first image at a first time point and the second image sensor is configured to capture a second image at a second time point;
    extracting image parameters from the images;
    analyzing the image parameters to determine one or more attributes about an object in the scene;
    receiving a first position of the first image sensor from a position sensor;
    receiving a second position of the first image sensor from the position sensor;
    determining a distance change by the first image sensor based on the first position and the second position; and
    determining a distance of the object relative to the image sensors based on the first image, the second image, the distance change by the first image sensor, and the one or more attributes about the object.

2. The distance measuring method according to claim 1, wherein the image parameters include pixel color values and/or pixel illuminance values.

3. The distance measuring method according to claim 1, wherein the image sensors are paired or configured to belong to a same sensor group.

4. The distance measuring method according to claim 1, wherein the determined distance is a first object distance and the method further comprises:
    receiving a second object distance measured by a range finder; and calibrating the first object distance using the second object distance.

5. The distance measuring method according to claim 1, wherein the determination of the object distance includes comparing a signal amplitude captured in the images.

6. The distance measuring method according to claim 1, wherein the method further comprising: detecting a probe illumination of an object in the images; and, wherein the determination of the object distance is based on the detected probe illumination of the object.

7. The distance measuring method according to claim 1, wherein the determination of the object distance comprises at least one of:
comparing the images captured at the first and second image sensors;
calculating the object distance by comparing dimensions of the images;
calculating the object distance by comparing an image occupied area or pixel; or
calculating the object distance by comparing an image brightness.

8. The distance measuring method according to claim 1, wherein the position sensor is a G sensor or a global position sensor (GPS).

9. The distance measuring method according to claim 1, wherein the image sensors include a sensor configured to scan across a scene and be paired with one or more other sensors in different directions.

10. A system for measuring a distance, the system comprising a processor configured to execute machine-readable instructions such that when the machine-readable instructions are executed by the processor, the system is caused to perform:
storing parameters regarding image sensors;
receiving images captured by the image sensors, the images capturing a same scene, wherein the image sensors include a first image sensor located on a first location of a vehicle, and a second image sensor located on a second location of the vehicle, and wherein the first image sensor is configured to capture a first image at a first time point and the second image sensor is configured to capture a second image at a second time point;
extracting image parameters from the images;
analyzing the image parameters to determine one or more attributes about an object in the scene;
receiving a first position of the first image sensor from a position sensor;
receiving a second position of the first image sensor from the position sensor;
determining a distance change by the first image sensor based on the first position and the second position; and
determining a distance of the object relative to the image sensors based on the first image, the second image, the distance change by the first image sensor, and the one or more attributes about the object.

11. The system according to claim 10, wherein the image parameters include pixel color values and/or pixel illuminance values.

12. The system according to claim 10, wherein the image sensors are paired or configured to belong to a same sensor group.

13. The system according to claim 10, wherein the determined distance is a first object distance and the method further comprises:
receiving a second object distance measured by a range finder; and
calibrating the first object distance using the second object distance.

14. The system according to claim 10, wherein the determination of the object distance include comparing a signal amplitude captured in the images.

15. The system according to claim 10, wherein the method further comprising: detecting a probe illumination of an object in the images; and, wherein the determination of the object distance is based on the detected probe illumination of the object.

16. The system according to claim 10, wherein the determination of the object distance comprises at least one of:
comparing the images captured at the first and second image sensors;
calculating the object distance by comparing dimensions of the images;
calculating the object distance by comparing an image occupied area or pixel; or
calculating the object distance by comparing an image brightness.

17. The system according to claim 10, wherein the position sensor is a G sensor or a global position sensor (GPS).

18. The system according to claim 10, wherein the image sensors include a sensor configured to scan across a scene and be paired with one or more other sensors in different directions.

* * * * *